Oct. 20, 1959  G. R. ZANNI ET AL  2,909,030
AUTOMATIC BEAD LOOPING MACHINE
Filed March 30, 1956  3 Sheets-Sheet 1

INVENTORS.
Guido R. Zanni
Anthony E. Tortolani
BY Philip D. Jamieson

Elliot A. Salter
Atty.

Oct. 20, 1959

G. R. ZANNI ET AL 2,909,030

AUTOMATIC BEAD LOOPING MACHINE

Filed March 30, 1956

INVENTORS.
Guido R. Zanni
Anthony E. Tortolani
BY Philip D. Jamieson

Elliot A. Salter
Att'y.

Oct. 20, 1959 G. R. ZANNI ET AL 2,909,030
AUTOMATIC BEAD LOOPING MACHINE
Filed March 30, 1956 3 Sheets-Sheet 3
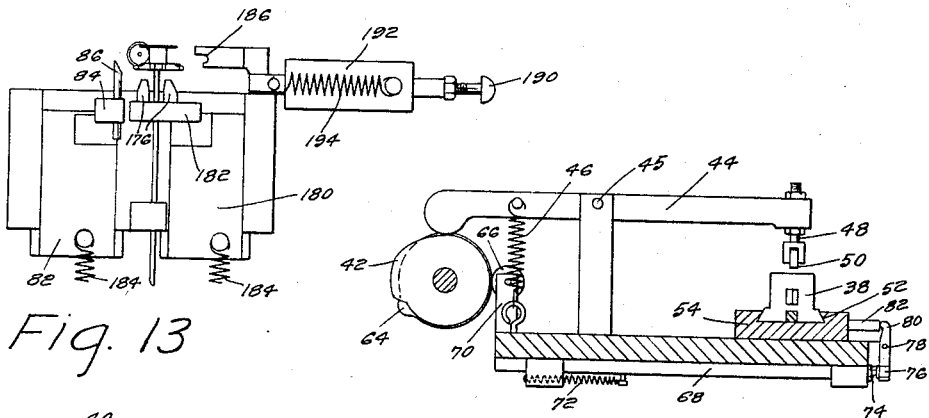
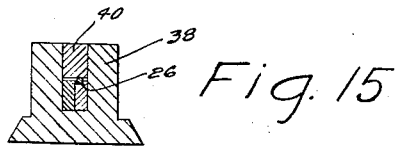
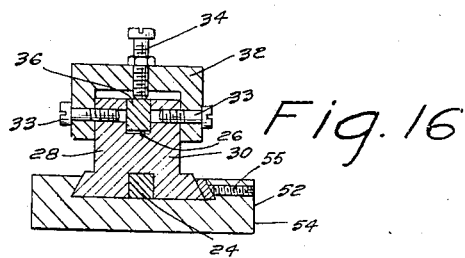
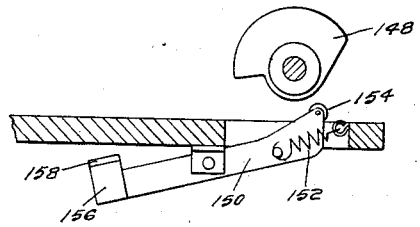
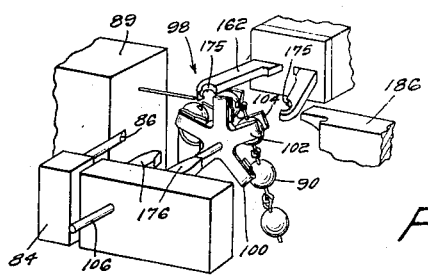
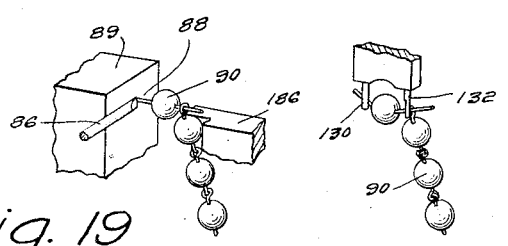
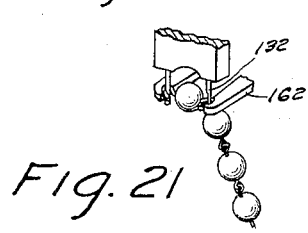
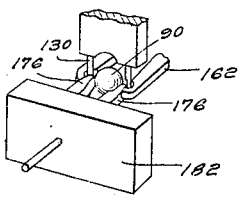
INVENTORS.
Guido R. Zanni
Anthony E. Tortolani
BY Philip D. Jamieson
Elliot A. Salter
Att'y.

United States Patent Office 2,909,030
Patented Oct. 20, 1959

2,909,030

AUTOMATIC BEAD LOOPING MACHINE

Guido R. Zanni, Providence, Anthony E. Tortolani, Johnston, and Philip D. Jamieson, Pontiac, R.I., assignors to Dorin Enterprises Corp., Johnston, R.I., a corporation of Rhode Island Application March 30, 1956, Serial No. 575,041

7 Claims. (Cl. 59—2)

The present invention relates generally to automatic bead looping machines and has particular reference to a machine for automatically producing beaded chains, ornamental necklaces, rosaries, and the like.

A primary object of the instant invention is the provision of a machine that will receive pierced beads, feed a length of wire through said beads, loop the ends of said wire, and then automatically inter-loop adjacent beads and wire to provide a continuous chain.

Another object of the instant invention is the provision of an automatic bead looping machine for producing beaded chains, each looped bead being interconnected directly with an adjacent looped bead, whereby the necessity of separate wire links for interconnecting adjacent beads is eliminated.

Another object is the provision of a bead looping machine which is entirely automatic, from the time the beads and wire are independently introduced to the machine until the completed beaded chain is produced, thereby greatly reducing the manpower necessary for bead looping operations whereby said manpower may be advantageously diverted to other uses.

A further object of the instant invention is the provision of an automatic bead looping machine comprising novel and improved bead handling mechanism.

Still another object is the provision of an automatic bead looping machine which will produce beaded chain at a much faster rate than has been heretofore possible by hand or machine, but which nevertheless is highly efficient in operation and which produces a highly desirable end product.

Other objects, features and advantages of the invention will become apparent as the description thereof proceeds when considered in connection with the accompanying illustrative drawings.

In the drawings which illustrate the best mode presently contemplated by us for carrying out our invention:

Fig. 13 is a plan view, on an enlarged scale, of the bead handling mechanism and some of its associated structure, including the wire cut-off tool, all of which form a part of the instant invention;

Fig. 14 is a section, on an enlarged scale, taken on line 14—14 of Fig. 2;

Fig. 15 is a section, on an enlarged scale, taken on line 15—15 of Fig. 2;

Fig. 16 is a section, on an enlarged scale, taken on line 16—16 of Fig. 2;

Fig. 17 is a section taken on line 17—17 of Fig. 1;

Fig. 18 is a perspective view, on an enlarged scale, showing the position of the bead handling mechanism and some of its associated structure at the commencement of the cycle of operation of the instant invention, certain of the parts having been removed for purposes of clarity;

Fig. 19 is a perspective view, on an enlarged scale, showing the position of the beads and the cut-off mechanism shortly after the initiation of the cycle of operation of the instant machine;

Fig. 20 is a perspective view, on an enlarged scale, showing the relative position of the looping pins and threaded bead after the wire has been cut;

Fig. 21 is a perspective view, on an enlarged scale, showing the loop forming clamping jaws in operative position; and Fig. 22 is a perspective view, on an enlarged scale, showing the crimping hammers in operative position.

Figure 1:
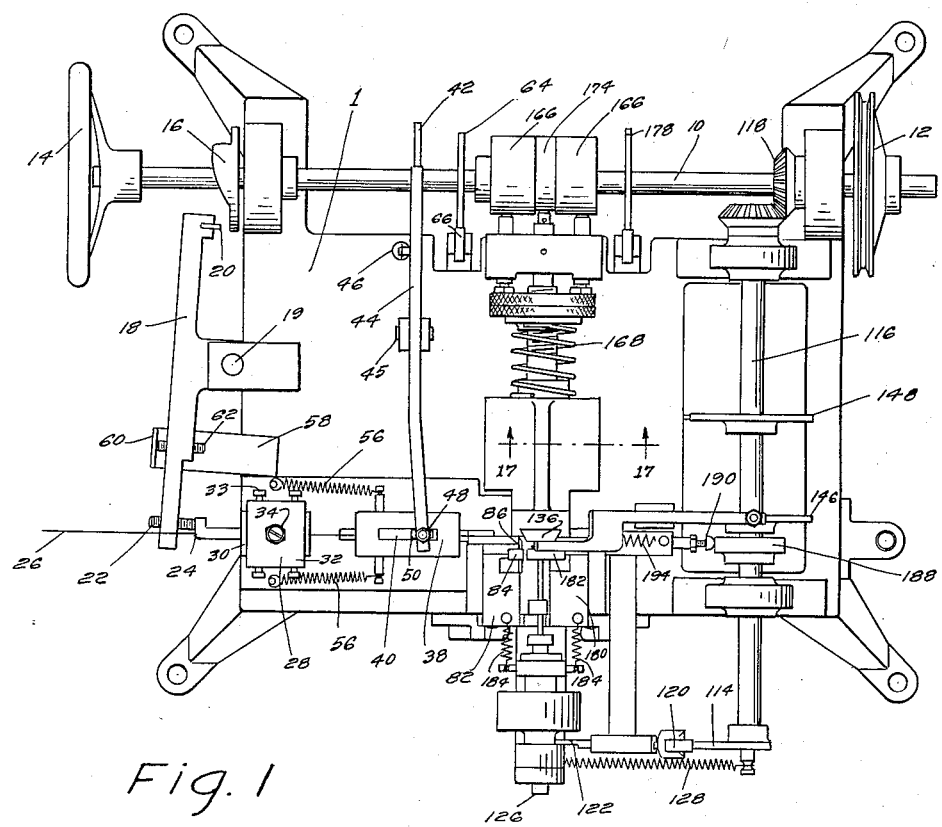
Fig. 1 is a plan view of an automatic bead looping machine constructed in accordance with the instant invention.

It has been found desirable to provide a machine which will automatically provide beaded chains for use with ornamental necklaces, rosaries, and the like. More specifically, the instant machine is directed to the provision of a beaded chain comprising pierced beads, each of which has extending therethrough a length of wire, said wire being looped at each of its extremities, and said loops each being interconnected with the adjacent loop of an adjacent bead. Heretofore this operation has been performed either by hand or by semi-automatic means which, as will be obvious, results in a time-consuming and costly operation. Machines have heretofore been devised for automatically providing beaded chains, but said machines were directed to beaded chains of the type wherein each looped bead was interconnected with the next adjacent looped bead by means of a separate connecting link. As will become apparent as the description of the instant invention proceeds, our automatic bead looping machine eliminates necessity of using such a connecting link, thereby resulting in a substantial saving in material, as well as a more attractive finished product.

Accordingly, there has been provided a machine wherein the pierced beads are deposited into a hopper from which they gravitate into an elongated channel for single-file feed to a bead looping station. Means are provided in connection with the bead feed channel for insuring that the bead will be in a predetermined position when it reaches the looping station. Our machine further comprises means for automatically feeding wire stock through the pierced opening in the bead, cutting off the wire stock at a predetermined length, looping said wire at each extremity of the bead, and then moving said looped bead to a position wherein during the next cycle of operation one of said loops will automatically be interconnected with the adjacent loop of the next subsequent bead.

*Wire feeding mechanism*

Referring now to the drawings, our machine comprises a frame 1 having rotatably mounted thereon a main shaft 10 which has fixedly mounted thereon at one extremity a sheave 12 adapted to be belt driven by a conventional gear reduction motor (not shown). At the opposite extremity of shaft 10, there is provided a hand wheel 14 whereby said shaft may be manually rotated when such is necessary for purposes of adjustment and the like. Also mounted on shaft 10 for rotation therewith is a feed cam 16 which intermittently actuates a feed lever 18 pivoted to the frame as at 19 which at its cam engaging end is provided with a roller 20 for friction reducing purposes. At its other extremity, lever 18 is provided with a threaded stud 22 which is adapted to engage a slidably mounted plunger bar 24.

The wire stock 26 is fed from a conventional roller or other supply (not shown) and extends through a clamping housing 28. As will be noted in Fig. 16, the housing 28 comprises a base block 30 having attached thereover a cover portion 32 by means of screws 33 or the like. An adjusting screw 34 extends down through the top of cover 32 and engages a vertically slidable bar 36 mounted in the upper portion of base block 30. As will be obvious, the wire 26 lies below the bar 36 whereby the tension on said wire may be varied by adjusting screw 34. From the housing 28, the wire extends through a gripping element 38 where once again the wire is positioned below a vertically slidable bar 40.

Figure 2:
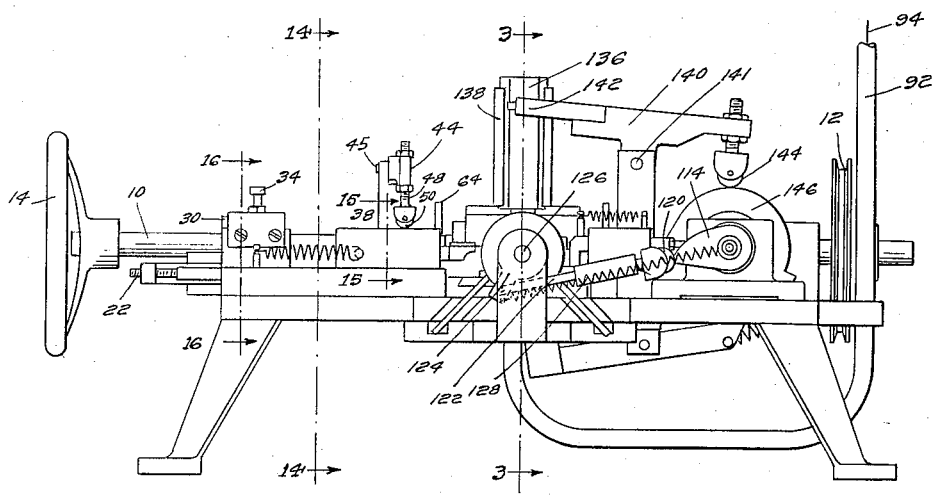
Fig. 2 is a front elevation thereof.

Referring now to Figs. 1, 2 and 14, it will be noted that shaft 10 is provided with a lock lever cam 42 which actuates a lock lever 44 pivoted as at 45 and maintained in engagement with said cam by means of spring 46. At its opposite extremity, lock lever 44 is provided with a downwardly depending arm 48 carrying a roller 50. The arm 48 is threadedly attached to lock lever 44 whereby the vertical position of the roller 50 may be readily adjusted. The roller 50 overlies the slidable bar 40 in gripping element 38 whereby when cam 42 actuates lever 44 in a clockwise direction (Fig. 14), said roller will engage bar 40 and force the latter downwardly against the wire 26 to positively grip the latter. As will be seen most clearly in Figs. 14 and 15, gripping element 38 is slidably mounted in trackways 52 provided in a block 54 fixedly mounted to the machine frame. It will be noted that the base block 30 is also mounted in the trackways 52 whereby its longitudinal position may be readily adjusted, but once the desired adjustment is obtained, said block is locked fixedly in position by means of clamping screws 55 or the like.

The operation of the wire feed mechanism is as follows. Cam 16 engages the roller 20 of lever 18 and causes said lever to pivot in a counterclockwise direction, looking at Fig. 1. Upon being so actuated, the stud 22 of lever 18 moves into engagement with plunger bar 24 and forces the latter to slide inwardly. Plunger bar 24 extends through block 30 in slidable relation thereto and is secured to gripping element 38 thereby causing the latter to also slide inwardly in its trackway 52. Just prior to the inward sliding movement of gripping element 38, the cam 42 has actuated lever 44 whereupon the roller 50 has moved downwardly to cause the bar 40 to securely grip the wire 26. Accordingly, it will be understood that when gripping element 38 moves inwardly due to the thrust imparted thereto by plunger bar 24, the wire will be carried therewith. It will be understood that the clamping housing 28 through which the wire 26 extends is adjusted by means of screw 34 so that bar 36 exerts a very slight downward pressure on the wire. It will be understood that while this pressure is not sufficient to retard the inward movement of the wire when it is carried by gripping element 38, it is sufficient to retain the wire in its inward position when gripping element 38 returns to its normal position by means of springs 56.

Means may be provided for varying the length of inward movement of the wire, said means taking the form of a bracket 58 fixedly secured to the machine frame and having at its outer extremity a flange 60 which coacts with a threaded stud 62 extending through the lever 18. It will be obvious that by varying the adjustment of stud 62, the length of stroke of stud 22 and hence plunger bar 24 and gripping element 38 may be readily adjusted.

Wire cut-off mechanism

Referring primarily to Figs. 1, 14, 18 and 19, the wire cut-off mechanism which forms a part of the instant machine will now be described. Main shaft 10 is provided with a cut-off cam 64 fixedly mounted thereon for rotation therewith. As will be seen most clearly in Fig. 14, cam 64 is in engagement with a roller follower 66, which follower is secured to a slidably mounted bar 68 by means of an upstanding bracket 70. The bar 68 is slidably mounted on the bottom surface of the machine frame and is normally biased to the position of Fig. 14 by means of a spring 72, but it will be obvious that when the high portion of cam 64 engages roller 66, said bar 68 will be urged forwardly against the action of said spring 72. The forward end of bar 68 has threadedly attached thereto a stud element 74 which is adapted to engage a lever 76 pivoted to the machine frame as at 78 and having an upper portion 80 in engagement with a slidable block 82. The slidable block 82 has secured thereto an upstanding support 84 which has mounted therein a cut-off tool 86. As will be seen most clearly in Figs. 18 and 19, the cut-off tool is positioned so that upon inward movement thereof it shears off wire 26 adjacent the aperture 88 from which the wire extends. It will be understood that aperture 88 extends through a fixed block 89 through which the wire is fed by the means aforedescribed.

Briefly summarizing, it will be seen that cam rotation of cam 64 will cause slidable bar 68 to move forwardly whereby abutment element 74 will cause lever 76 to pivot in a counterclockwise direction, the upper end 80 of said lever thereby causing the slidable block 82 and the cut-off tool carried thereon to move inwardly to effect the cutting operation. It will be understood that cut-off cam 64 is timed in relation to aforedescribed feed cam 16 whereby the wire 26 is first fed inwardly before the cutting tool 86 moves inwardly to sever same. It will further be understood that by adjusting the stud element 74, the length of the stroke of the cut-off tool may be readily varied.

Bead handling mechanism

Figure 7:
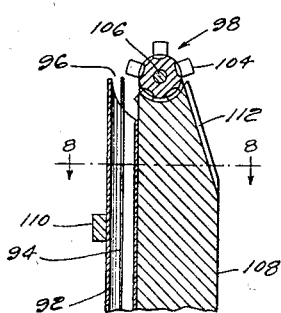
Fig. 7 is a section taken on line 7—7 of Fig. 6.
Figure 5:
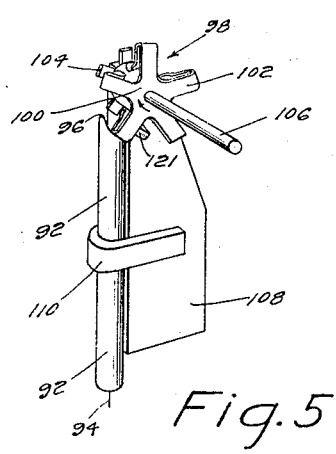
Fig. 5 is a detail perspective, on an enlarged scale, showing a portion of the bead handling mechanism which forms a part of the instant invention.
Figure 6:
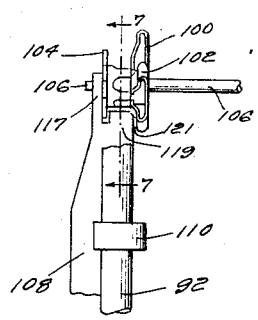
Fig. 6 is an edge view of the structure shown in Fig. 5.
Figure 8:
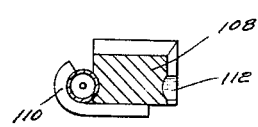
Fig. 8 is a section taken on line 8—8 of Fig. 7.
Figure 9:
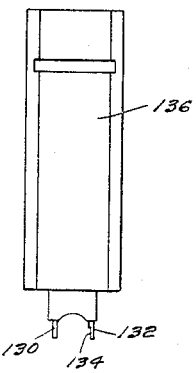
Fig. 9 is a front elevation, on an enlarged scale, of the looping pin structure which forms a part of the instant invention.
Figure 10:
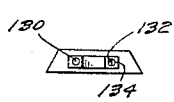
Fig. 10 is a bottom view of the structure shown in Fig. 9.

As has been hereinbefore stated, the instant machine is directed to the formation of beaded chains utilizing pierced beads 90. It will be understood that the beads are pierced before they are introduced to the instant machine and that any desirable form of hopper means (not shown) may be utilized to simultaneously receive a plurality of the beads for single-file introduction to the bead feed channel 92. Referring to Figs. 2 and 7, it will be noted that channel 92 is an elongated tube having extending therethrough a centrally located rod 94. It will be understood that as the beads are fed to the channel 92 they will be threaded on to the rod 94 wherefore to insure that the beads will be in a predetermined position as they exit from the channel 92 as at 96 (Fig. 7) and are received by the bead handling mechanism generally designated at 98.

Figure 11:
Fig. 11 is a detail perspective, on an enlarged scale, of a coupling member which forms a part of the instant invention.
Figure 12:
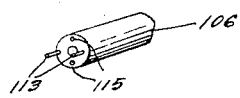
Fig. 12 is a fragmentary detail perspective of the shaft end that cooperates with the coupling member of Fig. 11.

The bead handling mechanism 98 comprises a resilient gripping element 100 having radially extending therefrom a plurality of gripping fingers 102. The fingers 102 cooperate with aligned finger elements 104 which are disposed in spaced relationship thereto whereby to provide a resilient pocket between each pair of said aligned fingers. Gripping element 100 and the fingers 104 are both secured to a shaft 106 for rotation therewith, which shaft is adapted to be intermittently rotated by means hereinafter described. Also, the gripping element 100 and the cooperating fingers 104 are slidable as a unit through a slight degree of movement for reasons which will hereinafter be made apparent. This slidable movement is possible by virtue of the fact that shaft 106 is provided with a coupling member 107 (Fig. 11) having a pair of pins 109 extending therefrom and a pair of bores 111 therein which cooperate with the pins 113 and bores 115 provided in the shaft 106 (Fig. 12) for effecting a rotary clutch while at the same time allowing relative axial movement therebetween.

The beads 90 may be forced through channel 92 by any desirable means such as gravity or a spring follower (not shown) whereby a succession of beads will continuously emanate from the exit end 96 of said channel. As each bead reaches the exit of the channel, it will be resiliently grasped between a cooperating pair of fingers 102 and 104, it being obvious that the rod 94 will always cause the bead to be in a set position when received between said fingers. It will be obvious that this position is such that when the bead has reached the 12 o'clock position in the rotation of gripping element 100, that the pierced opening of said bead will be horizontally and centrally disposed.

As will be seen most clearly in Figs. 5 through 8, the exit portion of tube 92 is secured to a block 108 which underlies the bead handling mechanism by means of a bracket 110 or any other suitable securing means. It will be noted that the edge of block 108 remote from the channel 92 is provided with a concave groove 112 extending along an inclined edge portion thereof. It will further be noted (Fig. 6) that the block 108 is provided with an upwardly extending ear portion 117 disposed rearwardly of the fingers 104, said ear portion acting as bearing means for the inner end of shaft 106. Block 108 is further provided with an upwardly extending portion 119 which is disposed between the lower sections of fingers 102 and 104 whereby upon movement of block 108 axially with respect to shaft 106, said block, shaft and fingers will all move as a unit, axial movement of said shaft being permissible due to the aforedescribed coupling structure 107.

In order to better insure proper positioning of the beads as they are received by the fingers 102 and 104, cam means 121 are provided on the face of block 108 for spreading the fingers 102 just prior to receiving a bead from channel 92 and then allowing said fingers to clamp closed on the bead. It has been found that if the beads are forced between the fingers 102 and 104, misalignment frequently occurs.

Figure 3:
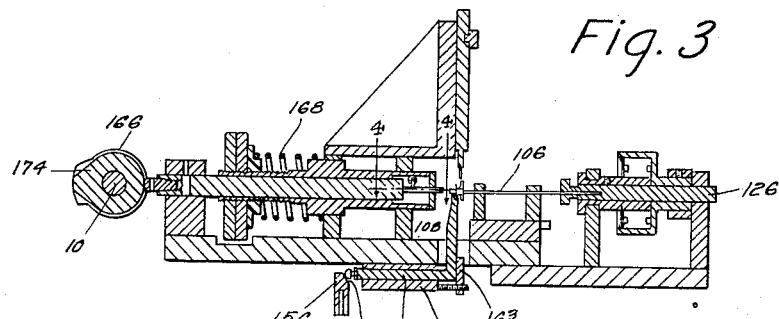
Fig. 3 is a section taken on line 3—3 of Fig. 2.

Intermittent rotation is imparted to shaft 106 by means of a cam 114 secured to shaft 116, which shaft is driven by the main shaft 10 by means of bevel gears 118. As will be seen most clearly in Fig. 2, cam 114 engages the roller follower 120 attached to a longitudinal thrust rod 122 which is pivotally attached to a dog 124 for imparting intermittent rotation to a shaft 126 on which said dog 124 is mounted. It will be understood that dog 124 is freely mounted on the shaft 126 but cooperates with conventional ratchet mechanism or the like (not shown) fixed to said shaft for imparting periodic rotation thereto. A spring 128 maintains cam follower 120 in contact with the cam 114. As will be seen most clearly from Fig. 3, shaft 126 is secured to the aforementioned shaft 106 whereby as the former periodically rotates, the latter will likewise rotate, carrying therewith the aforedescribed gripping mechanism 100 and the resilient fingers 102 and 104. Indexing means (not shown) of a conventional nature may be provided for insuring positive positioning of shafts 126 and 106 after each periodic rotation thereof. It will be understood that the number of radially extending fingers 102 and 104 will determine the amount of rotation which is imparted to the shaft 106 as a result of each thrust of the bar 122. In other words, in our machine as illustrated, five radial fingers are provided whereby each rotation of the shaft 106 will amount to 72 degrees. The number of fingers employed and the degree of rotation is determined by the size of the particular beads being utilized, and it will be understood that where larger beads are being used, four fingers may be sufficient to provide the necessary operation, in which case the degree of rotation of shaft 106 would be 90 degrees at each increment.

*Looping mechanism*

Figure 4:
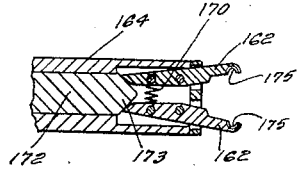
Fig. 4 is a fragmentary section, on an enlarged scale, taken on line 4—4 of Fig. 3.

As aforedescribed, when the individual beads emanate from the exit portion 96 of channel 92, they are immediately resiliently gripped between a cooperative pair of fingers 102 and 104 and upon the next intermittent rotation of shaft 106 are carried to the 12 o'clock position in the cycle of operation. In this position, the opening extending through said bead is horizontal and centrally disposed, and it will be understood that said opening is in alignment with the wire 26 being inwardly fed, as aforedescribed. When the bead reaches this uppermost or 12 o'clock position, a pair of looping pins 130 and 132 move downwardly on either side of said bead, as shown most clearly in Figs. 20 through 22. The pin 132 is provided with a flat portion 134 at its lowermost extremity for reasons which will hereinafter become apparent. The looping pins 130 and 132 depend from a vertically slidable rack 136, which rack is slidably received in trackways 138 affixed to the machine frame. A lever 140 pivoted at 141 has one of its ends 142 secured to the rack 136 while the other end thereof carries a roller follower 144 in engagement with a cam 146 mounted on the shaft 116. It will be apparent that as cam 146 causes the roller 144 to move upwardly, end 142 of the lever 140 will move the rack 136 downwardly thereby bringing the pins 130 and 132 into the position shown in Figs. 20 to 22. As soon as the pins are moved into this downward position, wire 26 is fed inwardly by the means hereinbefore described and extends through the bead 90 as shown in Fig. 19. As soon as this has taken place, cut-off tool 86 moves in and severs the wire, leaving the bead with a substantially equal length of wire extending from either end thereof. The pins 130 and 132 are disposed forwardly of the wire and make slight contact therewith, this frictional contact being sufficient to retain the wire in position as it is being severed. Immediately subsequent to the severing of the wire, means are effective to move the bead slightly forward whereby pins 130 and 132 cause the threaded wire to bend slightly rearward, as shown in Fig. 20. The purpose of this is so that when the loop is formed around the pins 130 and 132, the loop will be centrally disposed with respect to the bead. The means for moving the bead forwardly comprise a cam 148 mounted on shaft 116, which cam engages a lever 150 pivoted to and extending below the machine frame, as shown most clearly in Fig. 17. The lever 150 is normally urged to the postion of Fig. 17 by means of a spring 152 and is provided at its cam engaging end with a roller 154. The other extremity of lever 150 is provided with an upwardly extending portion 156 having an inclined surface 158 disposed at its upper edge, note Fig. 3. The surface 158 is in engagement with an extension 160 of the block 108, said block 108 being secured to gripping element 100 and the fingers 102 and 104, as aforedescribed. It will be obvious that as cam 148 depresses the roller 154, end 156 of the lever 150 will move upwardly whereupon the flat surface 158 will cam the block 108 a very slight distance forwardly, note Fig. 3. Block 108 and its extension 160 which is slidably mounted in depending element 161, are biased to their normal position by means of a spring (not shown), and adjustable stop means 163 are secured to block 108 to properly position the terminal of extension 160 in alignment with the surface 158 when the parts are in their normal, non-operative positions. As soon as the parts have attained the position of Fig. 20, a pair of clamping jaws 162 are moved forwardly until they become in alignment with the looping pins 130 and 132. The jaws 162 are pivotally mounted in a slidable rack 164, which rack is moved forwardly by means of cams 166 mounted on shaft 10. Rack 164 is normally maintained in its rearward position by means of a spring 168, as will be seen most clearly from Fig. 1. As will be seen most clearly in Fig. 4, the clamping jaws 162 are normally maintained in non-operative position by means of a spring 170. Accordingly, means are provided for moving said jaws to closed or operative position against the action of the spring 170 when said jaws have moved forwardly into alignment with the pins 130 and 132. Said means comprise a bar 172 slidably mounted within the rack 164, which bar has a wedge-shaped forward portion 173 adapted to enter between the rear of the pivoted jaws 162 whereby to spread said rear portion apart thereby causing the forwardmost portion of the jaws to clamp closed, all in a manner which is throught to be clearly illustrated in Fig. 4. The forward motion of the bar 172 is actuated by means of a cam 174 located intermediate the aforementioned cams 166. It will be understood that cam 174 is timed with relation to cams 166 whereby the latter first moves the rack 164 forwardly to bring the jaws into position, and then the former is effective to close said jaws thereby bending the wire around the pins 130 and 132, as shown most clearly in Fig. 21. In order that the wire may not inadvertently slip out from the jaws 162 as the latter are closing, grooves 175 may be provided on the inner surfaces thereof, as shown most clearly in Fig. 18. Since this action does not provide a completely closed loop, crimping hammers 176 are provided for closing said loops. Said crimping hammers are moved forwardly into operative position by means of a cam 178 maintained on shaft 10 which cooperates with a slidable block 180 carrying thereon a support 182 from which said hammers extend. Since the operation of cam 178 and block 180 is identical to the aforedescribed operation of cam 64 and block 82 for performing the cut-off operation, no further description of this structure is deemed necessary. As will be noted most clearly from Fig. 1, both the blocks 82 and 180 and normally biased in their outward or non-operative position by means of springs 184.

When loops are completely formed, the parts have returned to their non-operative positions, as shown in Fig. 18, and the indexing mechanism is effective to rotate shaft 106 and the resilient finger elements carried thereon to bring the next bead into 12 o'clock position. As will be seen most clearly in Fig. 18, it will be noted that the bead which has just been looped is so positioned that its rearward loop is in alignment with the opening extending through the bead now in the 12 o'clock position. Thus when the wire 26 is fed inwardly it not only extends through the opening of said uppermost bead, but it also extends through the rear loop of the bead which has just been looped. In order that said loop will be properly supported for threading by the inwardly fed wire, supporting means in the form of a block 186 are provided. Said supporting means are moved inwardly into the operative position of Fig. 19 by means of a cam 188 mounted on shaft 116, which cam engages a follow 190 for imparting reciprocal movement to a bar 192 from which the support 186 extends. A spring 194 normally maintains support 186 in non-operative position.

The flat portion 134 on the pin 132 has been provided in order to make room for the loop of the bead previously acted upon. In other words, if this flat portion were not present, pin 132 and the loop would be too hulky, and the clamping jaws 162 would not be able to form a loop commensurate in size to that being formed on the opposite side of the bead.

*Operation*

It is thought that the operation of the instant machine will be obvious from the foregoing description. However, a very brief description thereof will now be given, it being understood that the various cam mechanisms described heretofore are all timed in predetermined relation to provide the proper sequence of operation.

(1) The beads are fed through the channel 92 and are resiliently gripped by a cooperating pair of fingers 102 and 104 for movement to the 12 o'clock position of the gripping element 100. Due to the presence of rod 94 in the channel 92, the beads will always be in a predetermined position when so received, and hence when the beads reach said 12 o'clock position, their opening will always be in horizontal and in axial alignment with the incoming wire.

(2) As soon as a bead has reached this position, the pins 130 and 132 move downwardly.

(3) The wire 26 is then fed inwardly through the bead and through the rear loop of the bead next previously looped, said previously looped bead being held in proper position by supporting element 186 which has moved inwardly into the operative position of Fig. 19.

(4) Wire 26 is severed by inward movement of cutoff element 84.

(5) The bead is moved slightly forward whereby pins 130 and 132 are centrally disposed with respect thereto.

(6) Clamping jaws 162 move forwardly into alignment with the pins 130 and 132 and then move inwardly to clamp the wire around said pins (Fig. 21).

(7) Crimping hammers 176 move inwardly to complete the loops.

(8) Gripping element 100 is again indexed to bring the next bead into 12 o'clock position whereupon the cycle of operation again commences.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. An automatic bead looping machine comprising a rotatable gripping element having a plurality of radially disposed resilient gripping pockets for successively receiving pierced beads therein, means for imparting intermittent rotation to said element to successively move said beads to a looping station, means for insuring that the opening in each successive bead is in substantially the same position when said beads are at said looping station, means for automatically threading a length of wire through each bead and a previously formed loop at said looping station, means for automatically looping said wire at each of its extremities subsequent to the threading thereof, with the forward loop interlocking said previously formed loop and with the axis of the rearward loop substantially coinciding with the axis of the opening in the bead positioned in the following gripping pocket.

2. In the machine of claim 1, cam means for momentarily spreading each successive pocket immediately prior to receipt of a bead therein.

3. In the machine of claim 1, said wire being fed from a continuous length, and cutting means for automatically severing said wire after threading thereof through the bead and the previously formed loop at the looping station.

4. In the machine of claim 1, said looping means comprising a pair of movably mounted pins, cam means automatically operable prior to threading of the wire through each bead for moving said pins into operative position wherein they are disposed one on each side of the bead at said looping station, and means for automatically forcing the wire extremities around said pins to form loops, said cam means being automatically operable to move said pins to inoperative position subsequent to completion of said loops.

5. In the machine of claim 4, said last mentioned forcing means comprising clamping jaws for bending the wire around said pins, and crimping hammers openable to engage the wire ends for completing said loops.

6. In the machine of claim 4, said pins, when in operative position, being disposed adjacent opposite ends of the bead opening and slightly offset with respect thereto, whereby to make slight frictional contact with the wire as it is threaded through the bead.

7. In the machine of claim 6, means automatically operable immediately subsequent to the threading of the wire through the bead for moving said bead relative to said pins whereby to position the latter centrally with respect to the former, said means remaining operative for the duration of the looping operation.

References Cited in the file of this patent

UNITED STATES PATENTS

| | | |
|---|---|---|
| 1,205,233 | McCrudden | Nov. 21, 1916 |
| 1,693,558 | Durr | Nov. 27, 1928 |
| 2,190,129 | Stahl | Feb. 13, 1940 |
| 2,570,660 | Gamble | Oct. 9, 1951 |
| 2,740,252 | Schuster | Apr. 3, 1956 |
| 2,753,680 | Linnenbank | July 10, 1956 |